United States Patent
Turner et al.

(10) Patent No.: US 12,417,218 B2
(45) Date of Patent: Sep. 16, 2025

(54) SYSTEMS AND METHODS FOR SCALABLE DATASET CONTENT EMBEDDING FOR IMPROVED DATABASE SEARCHABILITY

(71) Applicant: Capital One Services, LLC, McLean, VA (US)

(72) Inventors: Taylor Turner, Richmond, VA (US); Jeremy Goodsitt, Champaign, IL (US); Michael Davis, Arlington, VA (US); Kenny Bean, Herndon, VA (US); Tyler Farnan, San Diego, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/458,676

(22) Filed: Aug. 30, 2023

(65) Prior Publication Data

US 2025/0077495 A1   Mar. 6, 2025

(51) Int. Cl.
*G06F 16/22* (2019.01)
*G06F 16/23* (2019.01)
*G06F 16/242* (2019.01)

(52) U.S. Cl.
CPC ...... *G06F 16/2228* (2019.01); *G06F 16/2358* (2019.01); *G06F 16/242* (2019.01)

(58) Field of Classification Search
CPC . G06F 16/2228; G06F 16/2358; G06F 16/242
See application file for complete search history.

(56) References Cited

U.S. PATENT DOCUMENTS

| | | | |
|---|---|---|---|
| 2020/0012626 A1* | 1/2020 | Walters | G06N 3/044 |
| 2020/0057757 A1* | 2/2020 | Spitz | G06F 16/248 |
| 2021/0365344 A1* | 11/2021 | Bui | G06F 17/18 |
| 2022/0358100 A1* | 11/2022 | Lucarelli | G06F 16/2282 |
| 2023/0169103 A1* | 6/2023 | Frazier | G06Q 10/105 707/737 |
| 2024/0005910 A1* | 1/2024 | Tomkins | G06N 5/022 |

* cited by examiner

*Primary Examiner* — Apu M Mofiz
*Assistant Examiner* — Oscar Wehovz
(74) *Attorney, Agent, or Firm* — Foley & Lardner LLP

(57) ABSTRACT

Methods and systems for scalable dataset content embedding for improved searchability. For example, the system may retrieve a first dataset from a first data source. The system may generate a first data profile of the first dataset. The system may generate a latent index of the first data profile based on processing the first data profile using a first embedding algorithm. The system may receive, via a user interface, a first request for a first text string. The system may generate an embedded request corresponding to the first request based on processing the first text string using the first embedding algorithm. The system may process the embedded request using the latent index. The system may generate for display, in the user interface, a result based on processing the embedded request using the latent index.

20 Claims, 4 Drawing Sheets

SYSTEMS AND METHODS FOR SCALABLE DATASET CONTENT EMBEDDING FOR IMPROVED DATABASE SEARCHABILITY

BACKGROUND

In recent years, the world has increasingly moved towards the use of electronic storage as the predominant storage method. As such, the amount and type of data in storage continues to expand. While data in a database is typically organized and stored in a structured manner to enable efficient storage, retrieval, and manipulation, in some instances the data may be stored in an unstructured fashion. Furthermore, even in instances where data is structured, the sheer amount of data to be processed presents a technical hurdle.

SUMMARY

Systems and methods are described herein for novel uses and/or improvements to increasing the efficiency and speed of database searching. As one example, systems and methods are described herein for increasing the efficiency and speed of database searching by generating a latent index of the database.

For example, as described above, if a database contains a significant amount of data, a search operation may take longer due to the sheer volume of information that needs to be processed. However, size is not the only limitation to efficiently and quickly performing operations on data in a data source. For example, poorly designed queries can also lead to slow search times. Queries that lack proper indexing or utilize inefficient join operations can cause the database engine to scan a large number of records, resulting in slower performance. This is further exacerbated in instances of data with complex joins and/or other relationships. For example, when searching across multiple tables with complex relationships, the query execution time can increase. Joining large tables or executing complex queries involving multiple conditions can put a strain on the database server and result in slower searches. This strain may be particularly problematic in instances of insufficient hardware resources. For example, if the database server has limited hardware resources such as the central processing unit (CPU), memory, or disk speed, it may struggle to handle complex queries or large data volumes efficiently.

Accordingly, the systems and methods described herein provide for the increased efficiency and speed when conducting database operations as well as overcoming the technical problems discussed above. The systems and methods accomplish this by generating a latent index of the database data. The latent index reduces the volume of data to be searched against (e.g., allowing increased scalability) and mitigates issues with complex relationships, as these relationships are preserved in the latent index. Moreover, to ensure that the complex relationships are preserved, the system may generate the latent index based on a data profile that is itself based on metadata (e.g., as opposed to directly on the data itself).

Furthermore, to overcome technical issues with poorly designed queries and allow operations to be conducted directly on the latent index, the systems and methods further describe generating an embedded request. The embedding request may comprise a text string and/or other command that is embedded using the same embedding algorithm as was used to (and is thus compatible with) the latent index. By doing so, the systems and methods allow searching a latent index with search terms that are user-friendly while ensuring that search terms, even though represented in an embedded form, are able to be matched to the terms in the latent index.

In some aspects, methods and systems are described for scalable dataset content embedding for improved searchability. For example, the system may retrieve a first dataset from a first data source. The system may generate a first data profile of the first dataset. The system may generate a latent index of the first data profile based on processing the first data profile using a first embedding algorithm. The system may receive, via a user interface, a first request for a first text string. The system may generate an embedded request corresponding to the first request based on processing the first text string using the first embedding algorithm. The system may process the embedded request using the latent index. The system may generate for display, in the user interface, a result based on processing the embedded request using the latent index.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
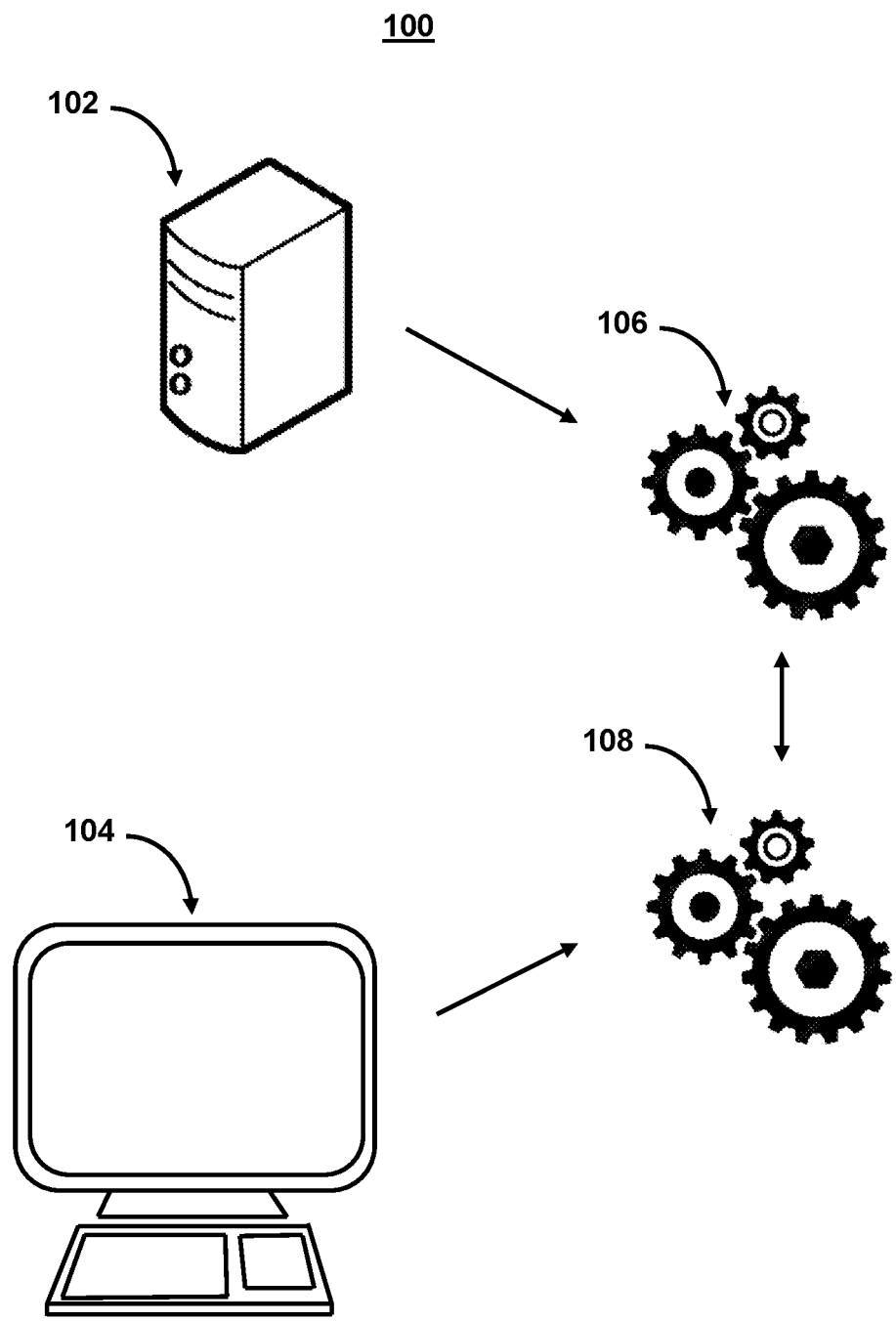
FIG. 1 shows an illustrative diagram for scalable dataset content embedding in accordance with one or more embodiments.

FIG. 1 shows an illustrative diagram for scalable dataset content embedding in accordance with one or more embodiments. For example, FIG. 1 shows system 100. System 100 includes data source 102 and user device 104. Data source 102 may comprise one or more attributes such as content, table structure, row and/or record format, columns and/or field format, data types, indexes, keys, relationships, normalization, storage structures, and/or file formats in the data source. For example, databases usually consist of one or more tables, which are structured as a collection of rows and columns. Each table represents a specific entity or concept, such as customers, products, or orders. Each row in a table represents a single record or instance of the entity being modeled. For example, in a customer table, each row could represent a unique customer. A row is also referred to as a record or tuple. Columns, also known as fields, define the specific data types and properties associated with the information being stored. Examples of columns in a customer table could include "customer_id," "name," "email," and "address." Each column has a predefined data type that determines the kind of data that can be stored in that column, such as integers, strings, dates, and/or floating-point numbers. Data types help enforce data integrity and enable efficient storage and retrieval. Indexes are data structures that enhance query performance by enabling quick lookup based on specific columns or combinations of columns. They are usually created on columns frequently used for searching or sorting data. A primary key is a unique identifier for each row in a table. It ensures that each record can be uniquely identified and provides a means for linking data across different tables through relationships.

System 100 may use an embedding algorithm to generate latent index 106 which may represent one or more attributes of the original (or native) data source. As referred to herein, "a latent index" may comprise a representation data in a data source that underlies a set of observed variables in the data. For example, a latent index may refer to an unobserved or hidden variable that underlies a set of observed variables. It is often used in latent variable modeling, such as factor analysis or structural equation modeling, to represent an underlying construct that cannot be directly measured but is inferred from observed variables. The latent index represents the common factors or dimensions that explain the correlations among the observed variables.

In some embodiments, the latent index may comprise an embedding that includes one or more latent variables. A latent variable may refer to an unobserved or hidden variable that captures underlying patterns or structures in the data. It represents information that is not directly measured or observed but is inferred from the available data. Latent variables may be used in various models, such as latent variable models, generative models, deep learning architectures, and/or other artificial intelligence models, including, but not limited to, machine learning, deep learning, etc. (referred to collectively herein as artificial intelligence models, machine learning models, or simply models). For example, in a generative model like a latent variable model or a variational autoencoder (VAE), the latent variables represent hidden factors that explain the observed data. These latent variables capture important features or characteristics of the data and can be used for tasks like data generation, dimensionality reduction, and/or clustering.

By using the latent index and/or embeddings of data in a data source, the system may reduce the dimensionality of the input data, making it more manageable and efficient for further processing. By capturing the underlying structure or semantics of the data, the system may use embeddings to improve the performance of machine learning models, as they enable algorithms to generalize better and capture complex relationships between data points. Moreover, the system may use embeddings to facilitate transfer learning, where pre-trained embeddings can be reused or fine-tuned for new tasks with limited labeled data.

In some embodiments, the latent index may be based on a relational database. Relational databases allow for the establishment of relationships between tables using primary and foreign keys. A foreign key in one table refers to the primary key of another table, enabling the creation of connections and associations between related data. The latent index may also preserve normalization and/or storage structures. Normalization is a process used to eliminate data redundancy and improve data integrity by organizing data into multiple tables based on their relationships, which helps ensure efficient data storage and reduces the risk of inconsistencies. Storage structures such as pages, blocks, or file systems are used to efficiently store and retrieve data on disk or in memory. Additionally or alternatively, the latent index may preserve file formats. For example, databases often use specific file formats to store data persistently. For instance, popular databases like MySQL, PostgreSQL, or Oracle use their proprietary file formats to store data on disk.

For example, the latent index (and/or latent variables) may represent an embedding of data. In some embodiments, an embedding may refer to a mathematical representation of data that captures its essential features or properties. The system may use the embedding to transform high-dimensional, heterogeneous, or unstructured data into a lower-dimensional, more structured representation that can be easily processed by machine learning algorithms. In some embodiments, the latent index may be a data structure that stores a subset of the data in a searchable format, usually based on specific columns or fields. Indexes allow the computer to locate relevant data quickly by referencing the index rather than scanning the entire database.

System 100 also includes user device 104, which may be used to receive user requests (e.g., of an operation) as well as generate results. For example, a result of one or more operations may be displayed on a user interface. As referred to herein, a "user interface" may comprise a human-computer interaction and communication in a device, and may include display screens, keyboards, a mouse, and the appearance of a desktop. For example, a user interface may comprise a way a user interacts with an application or a website.

In some embodiments, the system may also generate embeddings of search terms (e.g., in order to search a latent index) to create embedded request 108. For example, the system may employ embeddings based on natural language processing (NLP) tasks, such as language modeling, text classification, sentiment analysis, and machine translation. In these cases, words or phrases are mapped to continuous vectors in a lower-dimensional space, known as word embeddings or word vectors. For example, the system may use embedding models that include Word2Vec, GloVe, and FastText, which capture semantic relationships between words based on the contexts in which they appear in large text corpora.

Additionally or alternatively, the system may generate embeddings for other types of data, such as images, audio, and graphs. For example, the system may use convolutional neural networks (CNNs) to learn image embeddings by extracting hierarchical features from raw pixel data. These embeddings can then be used for tasks like image classification, object detection, or image retrieval.

In some embodiments, the system may generate an embedded request, which may comprise an embedding of a user request. For example, the system may generate an embedded request corresponding to the first request based on processing a first text string using a first embedding algorithm. For example, a text string, also known as a string or simply as text, is a group of characters that are used as data (e.g., for a data input). Text strings are most often comprised of words, but may also include letters, numbers, special characters, symbols, and/or number signs.

In some embodiments, the text string may comprise content for which an operation may be performed. For example, the text string may indicate content (e.g., a word) and an operation (e.g., a search) to be performed using the content. For example, an operation may refer to any action or manipulation performed on data (or a database) to retrieve, modify, or manage data. For example, databases are structured collections of data that are organized and stored in a way that allows efficient data management and retrieval.

As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices but can also be part of a live performance. Furthermore, user-generated content may include content created and/or consumed by a user. For example, user-generated content may include content created by another but consumed and/or published by the user.

The system may generate a data profile. As referred to herein, "a data profile" may comprise data actively and/or passively collected about the data. For example, the data profile may comprise metadata that describes the data. The data profile and/or metadata may also include a data characteristic. As referred to herein, "a data characteristic" may include information about data and/or information included in a directory of stored data settings, formats, preferences, and/or other information for the data.

In some embodiments, the operation may comprise querying, insertions, updates, deletions, joining, indexing, transactions, and/or other data manipulations. For example, querying may comprise retrieving data from a database by specifying search conditions and criteria. Queries can range from simple requests for specific records to complex operations involving multiple tables and conditions. Insertions may add new data records into a database. This operation involves specifying the table structure and providing values for the corresponding fields. Updates may include modifying existing data records in a database. This operation involves specifying the records to be updated and providing new values for the desired fields. Deletions may include removing data records from a database. This operation involves specifying the records to be deleted based on certain conditions or criteria. Joining may comprise combining data from multiple tables in a database based on related columns. Join operations are used to retrieve data that is spread across multiple tables and establish relationships between them. Indexing may comprise creating and maintaining indexes to improve the performance of data retrieval operations. Indexes are data structures that allow faster access to specific data based on predefined fields. Transactions may comprise sets of database operations that are treated as a single unit of work. Transactions ensure data integrity and consistency by enforcing atomicity (all or nothing), consistency, isolation, and durability (ACID) properties.

In some embodiments, the operation may comprise a computer operation. For example, a computer operation may refer to any action or task performed by a computer system. It may encompass a wide range of activities that computers are capable of executing, from basic arithmetic calculations to complex data processing and program execution such as input, processing, output, storage, communication, and/or control operations. For example, an input operation may comprise the process of providing data or instructions to a computer system from an external source, such as a keyboard, mouse, or other input devices. This allows the computer to receive information to work with. For example, an input operation may comprise a manipulation and transformation of data by the computer's CPU or other processing units. This includes tasks like performing calculations, executing algorithms, and manipulating data according to programmed instructions. An output operation may comprise a presentation or display of processed or transformed data to the user or another device. It involves generating and delivering results, such as text, images, sounds, or other forms of output, which can be viewed, heard, or interpreted. A storage operation may comprise the process of saving data or instructions for future use. This includes writing data to various types of storage devices, such as hard drives, solid-state drives, or external storage media like USB drives, DVDs, or cloud storage services. A communication operation may comprise the process of saving data or instructions for future use. This includes writing data to various types of storage devices, such as hard drives, solid-state drives, or external storage media like USB drives, DVDs, or cloud storage services. A control operation may comprise the management and coordination of various computer operations to ensure proper execution and functioning. This involves activities like managing resources, scheduling tasks, handling errors, and monitoring system performance.

Figure 2:
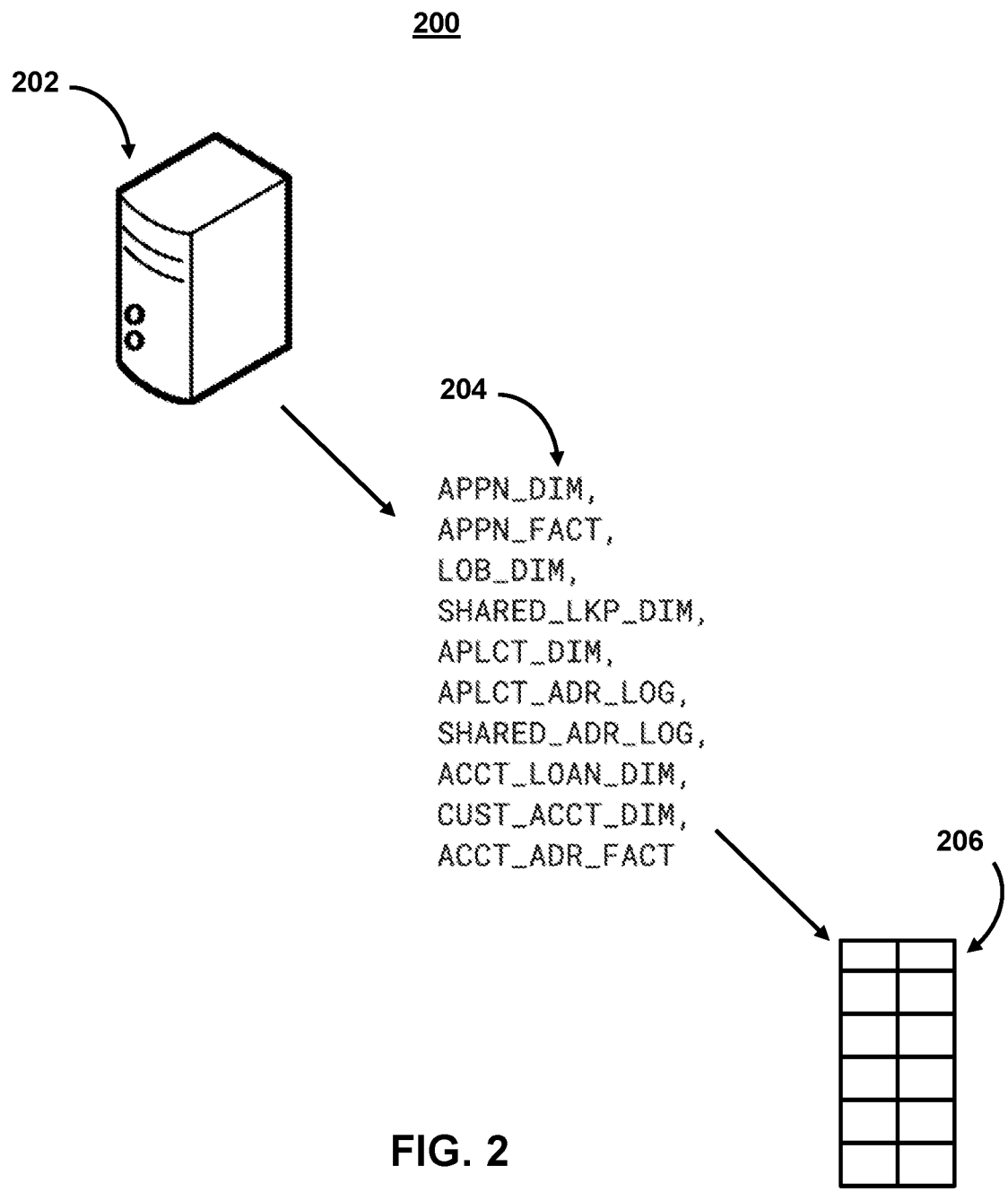
FIG. 2 shows an illustrative diagram for generating a data profile based on metadata of a dataset, in accordance with one or more embodiments.

FIG. 2 shows an illustrative diagram for generating a data profile based on metadata of a dataset, in accordance with one or more embodiments. For example, system 200 illustrates the creation of a data profile based on metadata 204 of data 202, wherein the resulting data profile is used to generate data profile 206. For example, while the latent index reduces the volume of data to be searched against (e.g., allowing increased scalability), the system may generate the latent index based on a data profile that is itself based on based on metadata (e.g., as opposed to directly on the data itself) in order to preserve complex relationships.

For example, as shown in FIG. 2, the system may identify metadata 204. As referred to herein, metadata refers to data that provides information about other data. For example, metadata 204 may describe various characteristics of the primary data (e.g., data 202), such as its content, structure, format, location, and other relevant details.

Metadata 204 may serve several purposes. Metadata 204 may help interpret the primary data, enable efficient organization and management of data, and/or facilitate the discovery and retrieval of specific information. Metadata can be found in various contexts, including digital files, databases, websites, and other information systems.

Metadata 204 may comprise descriptive metadata, which may describe the content and context of the primary data such as titles, descriptions, keywords, and abstracts. Metadata 204 may comprise structural metadata, which describes the organization and relationships between different components of data 202. For example, structural metadata may indicate a hierarchy of data instances and their interlinks. Metadata 204 may comprise administrative metadata, which may provide information about the technical aspects of data management, such as file formats, data creation dates, ownership, access permissions, and version control. Metadata 204 may comprise technical metadata, which describes the technical characteristics of the primary data, including file size, resolution, encoding, compression, and other technical details. Metadata 204 may comprise preservation metadata, which includes information about data provenance, digital rights management, and preservation actions taken.

System 200 may generate data profile 206. Data profile 206 may comprise a collection of information about metadata 204. Data profile 206 may comprise various data points and attributes that describe different aspects of metadata 204. Data profile 206 may be created by collecting and organizing data from various sources, such as different databases, websites, social media platforms, and other relevant sources.

For example, the system may generate data profile 206 based on data 202. In some embodiments, data profile 206 may be based on metadata 204 as opposed to raw or native data from data 202. By using metadata 204 to generate data profile 206 as opposed to the raw or native, data profile 206 is more storage-efficient and easier to process. For example, system 200 may retrieve metadata 204 for data 202 and generate a metadata sample based on metadata 204.

In some embodiments, the system may periodically and/or upon determining certain criteria are met, generate a new data profile. For example, the system may refresh the data profile used to generate the latent index based on a number of changes in a dataset, a length of time since the dataset was used to generate a data profile, a number of search request and/or other functions being compared against the latent index, and/or an accuracy and/or precision of the results of searches and/or other functions run against the latent index. For example, the system may determine a length of time since a previous data profile was generated. The system may compare the length of time to a threshold length of time. The system may determine to generate the first data profile in response to the length of time exceeding the threshold length of time.

In some embodiments, the system may periodically and/or upon determining certain criteria are met, generate a new data profile. For example, the system may refresh the data profile used to generate the latent index based on a number of changes in a dataset, a length of time since the dataset was used to generate a data profile, a number of search request and/or other functions being compared against the latent index, and/or an accuracy and/or precision of the results of searches and/or other functions run against the latent index. For example, the system may determine a number of changes between the first dataset and a previous dataset, wherein the previous dataset was used to generate a previous data profile. The system may compare the number of changes to a threshold number of changes. The system may determine to generate the first data profile in response to the number of changes exceeding the threshold number of changes.

In some embodiments, the system may also determine to generate the first data profile based on detecting other differences in the characteristics of the data sets (e.g., correlation thresholds, embedding distances, etc.). For example, correlation thresholds between profiles or embedding distance of the new data may indicate drift and therefore replacement.

In some embodiments, the system may determine particular categories of metadata that are required for the metadata sample. For example, the system may filter out some metadata while preserving other metadata to generate the metadata sample. For example, the system may retrieve a required metadata category. The system may determine a portion of the first metadata corresponding to the required metadata category. The system may use the portion to generate the metadata sample.

In some embodiments, the system may determine the portion of metadata that is used to generate the sample based on the type of searches and/or other functions to be performed on the latent index. For example, the system may determine that specific portions of metadata are required to be used to generate the data profile in order for the latent index to accurately be used to perform specific functions. For example, the system may receive a user input of a required search category for the latent index. The system may determine the required metadata category based on the required search category.

Figure 3:
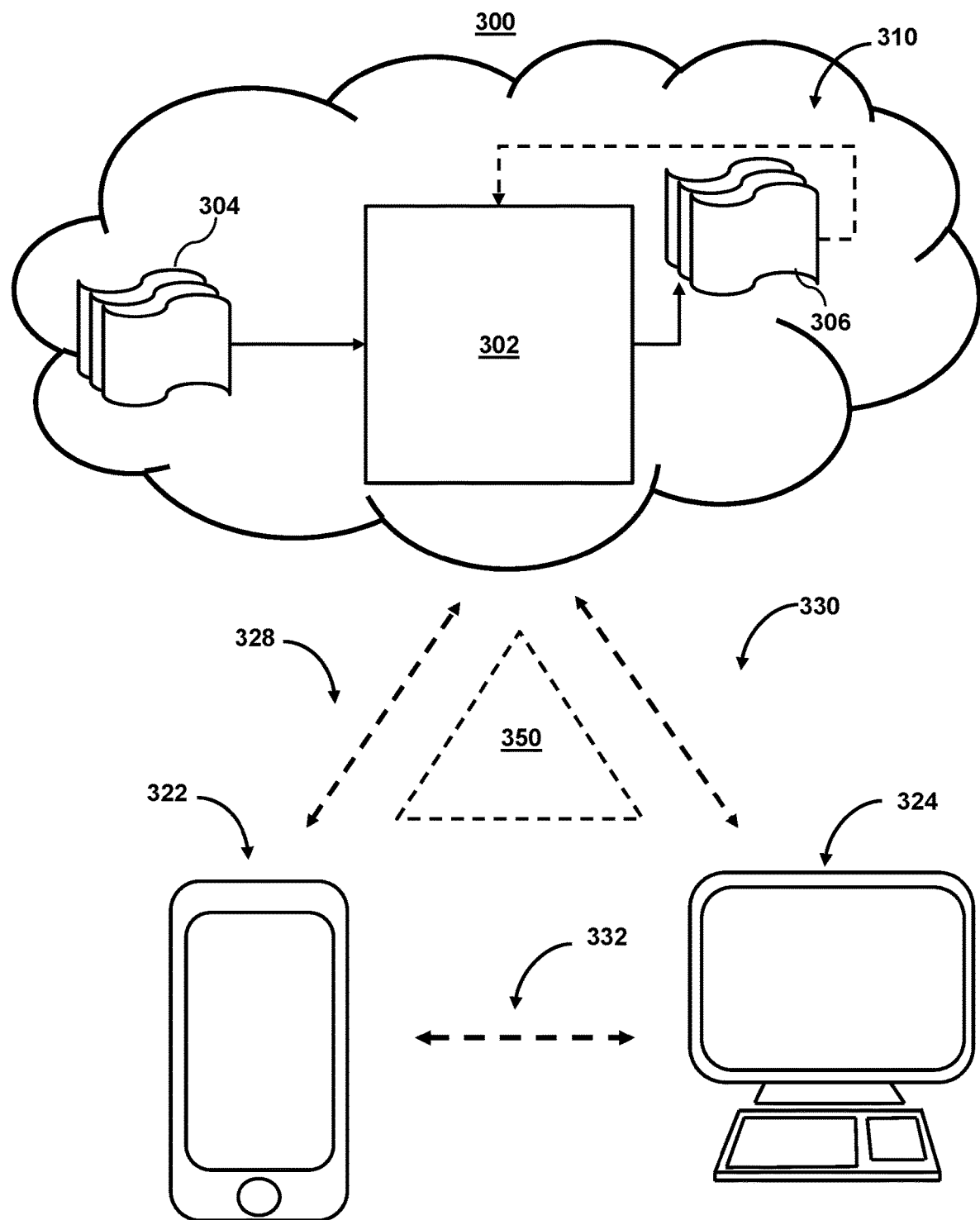
FIG. 3 shows illustrative components for a system used to generate a scalable dataset content embedding, in accordance with one or more embodiments.

FIG. 3 shows illustrative components for a system used to generate a scalable dataset content embedding, in accordance with one or more embodiments. For example, FIG. 3 may show illustrative components for an embedding algorithm. An embedding algorithm may refer to a technique used in modeling, machine learning, and/or NLP to represent data, such as words, sentences, or images, in a numerical or vectorized form. The goal of an embedding algorithm is to capture the underlying semantic or contextual relationships between the data points and encode them in a lower-dimensional space.

Word embeddings, for example, are widely used in NLP. They map words from a vocabulary to continuous vector representations in a high-dimensional space, where similar words are closer to each other. Word2Vec, GloVe, and FastText are popular embedding algorithms used to generate word embeddings.

The process of creating embeddings may involve training a model on a large dataset, such as a corpus of text or a collection of images, using unsupervised learning techniques. The model learns to encode the data points in a way that preserves their semantic or contextual relationships. Once trained, the model can generate embeddings for new, unseen data points. Embedding algorithms are not limited to text data. They can also be applied to other types of data, such as images or audio, to capture meaningful representations. For example, convolutional neural CNNs can be used to learn embeddings for images by training on large image datasets.

The resulting embeddings can be used as input features for various machine learning tasks, such as text classification, sentiment analysis, machine translation, or image recognition. They provide a dense and numerical representation of the data that can be easily processed and compared by machine learning models.

As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include one or more data sources. As described herein, a "data source" may refer to any location, system, and/or entity from which data is collected or obtained. The data source may be a physical or digital location, a database, a file, a sensor, an application, or even a person. Data sources may be used to gather information that is relevant for analysis, decision-making, or processing in various fields such as business, research, finance, healthcare, and many others. Data sources can provide structured or unstructured data, and they can vary in terms of size, format, and accessibility.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., embeddings of content).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., an embedded request, a result of an operation, etc.).

In some embodiments, the model (e.g., model 302) may automatically perform actions based on outputs 306. In some embodiments, the model (e.g., model 302) may not perform any actions. The output of the model (e.g., model 302) may be used to generate an embedded request, determine a result of an operation, etc.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to Front-End or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
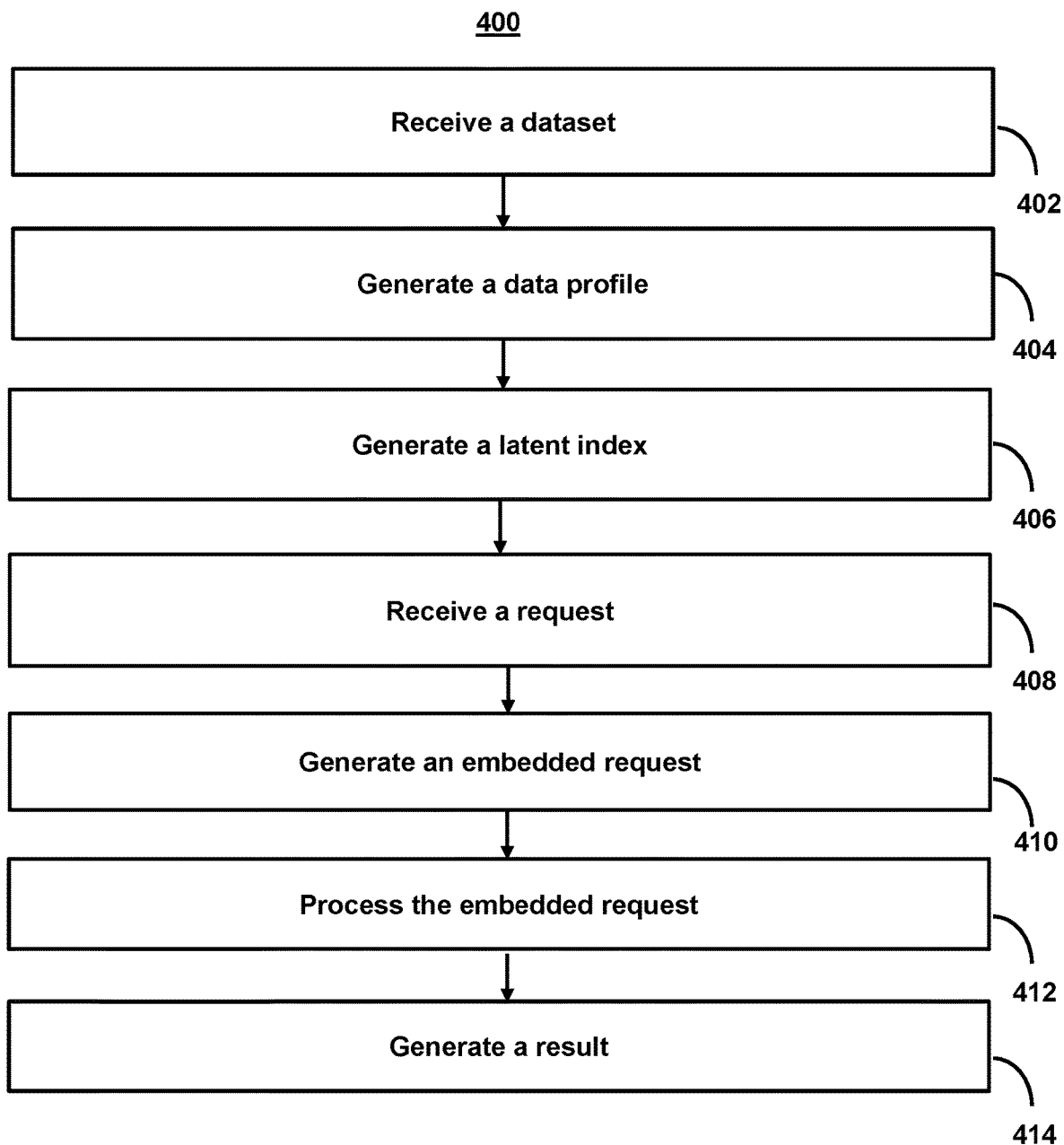
FIG. 4 shows a flowchart of the steps involved in generating scalable dataset content embeddings for improved searchability, in accordance with one or more embodiments.

FIG. 4 shows a flowchart of the steps involved in generating scalable dataset content embeddings for improved searchability, in accordance with one or more embodiments. For example, the system may use process 400 (e.g., as implemented on one or more system components described above) in order to generate latent indexes and/or embedded requests.

At step 402, process 400 (e.g., using one or more components described above) receives a dataset. For example, the system may retrieve a first dataset from a first data source. In some embodiments, the system may periodically and/or upon determining certain criteria are met, retrieve a dataset. For example, the system may refresh the dataset used to generate the data profile based on a number of changes in a dataset, a length of time since the dataset was used to generate a data profile, a number of search request and/or other functions being compared against the latent index, and/or an accuracy and/or precision of the results of searches and/or other functions run against the latent index. For example, the system may determine a number of changes between the first dataset and a previous dataset, wherein the previous dataset was used to generate a previous data profile. The system may compare the number of changes to a threshold number of changes. The system may determine to retrieve the first dataset in response to the number of changes exceeding the threshold number of changes.

At step 404, process 400 (e.g., using one or more components described above) generates a data profile. For example, the system may generate a first data profile of the first dataset. In some embodiments, the data profile may be based on metadata as opposed to raw or native data from the dataset. By using metadata to generate the data profile as opposed to the raw or native, the data profile is more storage-efficient and easier to process. For example, the system may retrieve first metadata for the first data profile and generate a metadata sample based on the first metadata.

In some embodiments the system may, periodically and/or upon determining certain criteria are met, generate a new data profile. For example, the system may refresh the data profile used to generate the latent index based on a number of changes in a dataset, a length of time since the dataset was used to generate a data profile, a number of search request and/or other functions being compared against the latent index, and/or an accuracy and/or precision of the results of searches and/or other functions run against the latent index. For example, the system may determine a length of time since a previous data profile was generated. The system may compare the length of time to a threshold length of time. The system may determine to generate the first data profile in response to the length of time exceeding the threshold length of time.

In some embodiments the system may, periodically and/or upon determining certain criteria are met, generate a new data profile. For example, the system may refresh the data profile used to generate the latent index based on a number of changes in a dataset, a length of time since the dataset was used to generate a data profile, a number of search request and/or other functions being compared against the latent index, and/or an accuracy and/or precision of the results of searches and/or other functions run against the latent index. For example, the system may determine a number of changes between the first dataset and a previous dataset, wherein the previous dataset was used to generate a previous data profile. The system may compare the number of changes to a threshold number of changes. The system may determine to generate the first data profile in response to the number of changes exceeding the threshold number of changes.

In some embodiments, the system may determine particular categories of metadata that are required for the metadata sample. For example, the system may filter out some metadata while preserving other metadata to generate the metadata sample. For example, the system may retrieve a required metadata category. The system may determine a portion of the first metadata corresponding to the required metadata category. The system may use the portion to generate the metadata sample.

In some embodiments, the system may determine the portion of metadata that is used to generate the sample based on the type of searches and/or other functions to be performed on the latent index. For example, the system may determine that specific portions of metadata are required to be used to generate the data profile in order for the latent index to accurately be used to perform specific functions. For example, the system may receive a user input of a required search category for the latent index. The system may determine the required metadata category based on the required search category.

At step 406, process 400 (e.g., using one or more components described above) generates a latent index. For example, the system may generate a latent index of the first data profile based on processing the first data profile using a first embedding algorithm. In some embodiments, the system may train an embedding algorithm based on previous versions of the latent index (e.g., generated on previous versions of the first dataset) and the search results of previous search requests on the previous versions of the latent index. For example, the system may determine whether previous latent index versions generated accurate and/or precise results. Based on the accuracy and/or precision, the system may adjust the training of the embedding algorithm. For example, the system may generate a first feature input based on the first dataset. The system may input the first feature input into the first embedding algorithm, wherein the first embedding algorithm is trained on previous versions of the latent index and search results of previous search requests on the previous versions of the latent index. The system may receive a first output from the first embedding algorithm, wherein the first output comprises the latent index.

At step 408, process 400 (e.g., using one or more components described above) receives a request. For example, the system may receive, via a user interface, a first request for a first text string. In some embodiments, the system may train an embedding algorithm based on previous versions of the latent index (e.g., generated on previous versions of the first dataset) and the search results of previous search requests on the previous versions of the latent index. For example, the system may determine whether previous latent index versions generated accurate and/or precise results. Based on the accuracy and/or precision, the system may adjust the training of the embedding algorithm to generate embedded requests. For example, the system may generate a second feature input based on the first dataset. The system may input the second feature input into the first embedding algorithm, wherein the first embedding algorithm is trained on previous versions of the latent index and search results of previous search requests on the previous versions of the latent index. The system may receive a second output from the first embedding algorithm, wherein the second output comprises the embedded request.

At step 410, process 400 (e.g., using one or more components described above) generates an embedded request. For example, the system may generate an embedded request corresponding to the first request based on processing the first text string using the first embedding algorithm. For example, receiving the first request for the first text string may further comprise the system receiving a first function to perform on the first dataset, and wherein processing the embedded request using the latent index may further comprise the system performing the first function on the latent index using the embedded request.

At step 412, process 400 (e.g., using one or more components described above) processes the embedded request. For example, the system may process the embedded request using the latent index. In some embodiments, the system may retrieve a first vector corresponding to the latent index. The system may retrieve a second vector corresponding to the embedded request. The system may determine a similarity between the first vector and the second vector. In some embodiments, the system may retrieve a first value from a first vector, wherein the first vector corresponds to the latent index. The system may retrieve a second value from a second vector, wherein the second vector corresponds to the embedded request. The system may determine whether the first value matches the second value.

At step 414, process 400 (e.g., using one or more components described above) generates a result. For example, the system may generate for display, in the user interface, a result based on processing the embedded request using the latent index. In some embodiments, the system may allow a user to enter a free-form text search and determine whether a dataset comprises the text. The system may do this based on a comparison of the embedded request and the latent index. By doing so, the system increases the speed and efficiency of searching the dataset. For example, the system may determine whether the first dataset comprises the first text string and determine the result based on whether the first dataset comprises the first text string.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for scalable dataset content embedding for improved searchability.
2. The method of any one of the preceding embodiments, further comprising: retrieving a first dataset from a first data source; generating a first data profile of the first dataset; generating a latent index of the first data profile based on processing the first data profile using a first embedding algorithm; receiving, via a user interface, a first request for a first text string; generating an embedded request corresponding to the first request based on processing the first text string using the first embedding algorithm; processing the embedded request using the latent index; and generating for display, in the user interface, a result based on processing the embedded request using the latent index.
3. The method of any one of the preceding embodiments, wherein generating the first data profile of the first dataset further comprises: retrieving first metadata for the first data profile; and generating a metadata sample based on the first metadata.
4. The method of any one of the preceding embodiments, wherein generating the metadata sample based on the first metadata further comprises: retrieving a required metadata category; determining a portion of the first metadata corresponding to the required metadata category; and using the portion to generate the metadata sample.
5. The method of any one of the preceding embodiments, wherein retrieving the required metadata category further comprises: receiving a user input of a required search category for the latent index; and determining the required metadata category based on the required search category.
6. The method of any one of the preceding embodiments, wherein processing the first data profile using the first embedding algorithm comprises: generating a first feature input based on the first dataset; inputting the first feature input into the first embedding algorithm, wherein the first embedding algorithm is trained on previous versions of the latent index and search results of previous search requests on the previous versions of the latent index; and receiving a first output from the first embedding algorithm, wherein the first output comprises the latent index.
7. The method of any one of the preceding embodiments, wherein retrieving the first dataset from the first data source further comprises: determining a number of changes between the first dataset and a previous dataset, wherein the previous dataset was used to generate a previous data profile; comparing the number of changes to a threshold number of changes; and determining to retrieve the first dataset in response to the number of changes exceeding the threshold number of changes.
8. The method of any one of the preceding embodiments, wherein generating the first data profile further comprises: determining a length of time since a previous data profile was generated; comparing the length of time to a threshold length of time; and determining to generate the first data profile in response to the length of time exceeding the threshold length of time.
9. The method of any one of the preceding embodiments, wherein generating the first data profile further comprises: determining a number of changes between the first dataset and a previous dataset, wherein the previous dataset was used to generate a previous data profile; comparing the number of changes to a threshold number of changes; and determining to generate the first data profile in response to the number of changes exceeding the threshold number of changes.
10. The method of any one of the preceding embodiments, wherein comparing the embedded request to the latent index further comprises: retrieving a first vector corresponding to the latent index; retrieving a second vector corresponding to the embedded request; and determining a similarity between the first vector and the second vector.
11. The method of any one of the preceding embodiments, wherein comparing the embedded request to the latent index further comprises: retrieving a first value from a first vector, wherein the first vector corresponds to the latent index; retrieving a second value from a second vector, wherein the second vector corresponds to the embedded request; and determining whether the first value matches the second value.
12. The method of any one of the preceding embodiments, wherein generating the embedded request corresponding to the first request based on processing the first text string using the first embedding algorithm comprises: generating a second feature input based on the first dataset; and inputting the second feature input into the first embedding algorithm, wherein the first embedding algorithm is trained on previous versions of the latent index and search results of previous search requests on the previous versions of the latent index; and receiving a second output from the first embedding algorithm, wherein the second output comprises the embedded request.
13. The method of any one of the preceding embodiments, wherein generating for display the result based on processing the embedded request using the latent index further comprises: determining whether the first dataset comprises the first text string; and determining the result based on whether the first dataset comprises the first text string.
14. The method of any one of the preceding embodiments, wherein receiving the first request for the first text string further comprises receiving a first function to perform on the first dataset, and wherein processing the embedded request using the latent index further comprises performing the first function on the latent index using the embedded request.
15. The method of any one of the preceding embodiments, further comprising: retrieving a first dataset from a first data source; generating a first data profile based on metadata of the first dataset; generating a latent index of the first data profile based on processing the first data profile using a first embedding algorithm; receiving, via a user interface, a first request for a first text string, wherein receiving the first request for the first text string further comprises receiving a first function to perform on the first dataset; generating an embedded request corresponding to the first request based on processing the first text string using the first embedding algorithm; processing the embedded request using the latent index, wherein processing the embedded request using the latent index further comprises performing the first function on the latent index using the embedded request; and generating for display, in the user interface, a result based on processing the embedded request using the latent index.
16. A non-transitory, computer-readable medium storing instructions that, when executed by a data processing apparatus, cause the data processing apparatus to perform operations comprising those of any of embodiments 1-15.
17. A system comprising one or more processors; and memory storing instructions that, when executed by the processors, cause the processors to effectuate operations comprising those of any of embodiments 1-15.
18. A system comprising means for performing any of embodiments 1-15.

What is claimed is:

1. A system for scalable dataset content embedding for improved searchability, the system comprising:
one or more processors; and
a non-transitory, computer-readable medium comprising instructions that when executed by the one or more processors cause operations comprising:
retrieving a first dataset from a first data source;
generating a first data profile based on metadata of the first dataset, wherein the first data profile is updated based on a length of time since the first dataset was used to generate the first data profile;
generating a latent index of the first data profile based on processing the first data profile using a first embedding algorithm, wherein the first embedding algorithm is trained by:
retrieving a previous version of the latent index; and
determining an accuracy of a previous response generated based on processing a previous embedded request using the previous version of the latent index, wherein the previous embedded request comprises a request that was processed using the previous version of the latent index and was generated using the first embedding algorithm;
receiving, via a user interface, a first request for a first text string, wherein receiving the first request for the first text string further comprises receiving a first function to perform on the first dataset;
generating an embedded request corresponding to the first request based on processing the first text string using the first embedding algorithm;
processing the embedded request using the latent index, and wherein processing the embedded request using the latent index further comprises performing the first function on the latent index using the embedded request; and
generating for display, in the user interface, a result based on processing the embedded request using the latent index.

2. A method for scalable dataset content embedding for improved searchability, the method comprising:
retrieving a first dataset from a first data source;
generating a first data profile of the first dataset;
generating a latent index of the first data profile based on processing the first data profile using a first embedding algorithm, wherein the first data profile is updated based on a number of requests compared against the latent index, wherein the first embedding algorithm is trained by:
retrieving a previous version of the latent index; and
determining an accuracy of a previous response generated based on processing a previous embedded request using the previous version of the latent index, wherein the previous embedded request comprises a request that was processed using the previous version of the latent index and was generated using the first embedding algorithm;
receiving, via a user interface, a first request for a first text string;
generating an embedded request corresponding to the first request based on processing the first text string using the first embedding algorithm;
processing the embedded request using the latent index; and
generating for display, in the user interface, a result based on processing the embedded request using the latent index.

3. The method of claim 2, wherein generating the first data profile of the first dataset further comprises:
retrieving first metadata for the first data profile; and
generating a metadata sample based on the first metadata.

4. The method of claim 3, wherein generating the metadata sample based on the first metadata further comprises:
retrieving a required metadata category;
determining a portion of the first metadata corresponding to the required metadata category; and
using the portion to generate the metadata sample.

5. The method of claim 4, wherein retrieving the required metadata category further comprises:
receiving a user input of a required search category for the latent index; and
determining the required metadata category based on the required search category.

6. The method of claim 2, wherein processing the first data profile using the first embedding algorithm comprises:
generating a first feature input based on the first dataset;
inputting the first feature input into the first embedding algorithm, wherein the first embedding algorithm is trained on previous versions of the latent index and search results of previous search requests on the previous versions of the latent index; and
receiving a first output from the first embedding algorithm, wherein the first output comprises the latent index.

7. The method of claim 2, wherein retrieving the first dataset from the first data source further comprises:
determining a number of changes between the first dataset and a previous dataset, wherein the previous dataset was used to generate a previous data profile;
comparing the number of changes to a threshold number of changes; and
determining to retrieve the first dataset in response to the number of changes exceeding the threshold number of changes.

8. The method of claim 2, wherein generating the first data profile further comprises:
determining a length of time since a previous data profile was generated;
comparing the length of time to a threshold length of time; and
determining to generate the first data profile in response to the length of time exceeding the threshold length of time.

9. The method of claim 2, wherein generating the first data profile further comprises:
determining a number of changes between the first dataset and a previous dataset, wherein the previous dataset was used to generate a previous data profile;
comparing the number of changes to a threshold number of changes; and
determining to generate the first data profile in response to the number of changes exceeding the threshold number of changes.

10. The method of claim 2, wherein processing the embedded request using the latent index further comprises:
retrieving a first vector corresponding to the latent index;
retrieving a second vector corresponding to the embedded request; and determining a similarity between the first vector and the second vector.

11. The method of claim 2, wherein processing the embedded request using the latent index further comprises:
   retrieving a first value from a first vector, wherein the first vector corresponds to the latent index;
   retrieving a second value from a second vector, wherein the second vector corresponds to the embedded request; and
   determining whether the first value matches the second value.

12. The method of claim 2, wherein generating the embedded request corresponding to the first request based on processing the first text string using the first embedding algorithm comprises:
   generating a second feature input based on the first dataset;
   inputting the second feature input into the first embedding algorithm, wherein the first embedding algorithm is trained on previous versions of the latent index and search results of previous search requests on the previous versions of the latent index; and
   receiving a second output from the first embedding algorithm, wherein the second output comprises the embedded request.

13. The method of claim 2, wherein generating for display the result based on processing the embedded request using the latent index further comprises:
   determining whether the first dataset comprises the first text string; and
   determining the result based on whether the first dataset comprises the first text string.

14. The method of claim 2, wherein receiving the first request for the first text string further comprises receiving a first function to perform on the first dataset, and wherein processing the embedded request using the latent index further comprises performing the first function on the latent index using the embedded request.

15. A non-transitory, computer-readable medium comprising instructions that when executed by one or more processors cause operations comprising:
   generating a first data profile of a first dataset, wherein the first data profile is updated based on a number of changes between the first dataset and a previous dataset;
   generating a latent index of the first data profile based on processing the first data profile using a first embedding algorithm, wherein the first embedding algorithm is trained by:
      retrieving a previous version of the latent index; and
      determining an accuracy of a previous response generated based on processing a previous embedded request using the previous version of the latent index, wherein the previous embedded request comprises a request that was processed using the previous version of the latent index and was generated using the first embedding algorithm;
   receiving, via a user interface, a first request for a first text string;
   generating an embedded request corresponding to the first request based on processing the first text string using the first embedding algorithm;
   processing the embedded request using the latent index; and
   generating for display, in the user interface, a result based on processing the embedded request using the latent index.

16. The non-transitory, computer-readable medium of claim 15, wherein generating the first data profile of the first dataset further comprises:
   retrieving first metadata for the first data profile; and
   generating a metadata sample based on the first metadata.

17. The non-transitory, computer-readable medium of claim 16, wherein generating the metadata sample based on the first metadata further comprises:
   retrieving a required metadata category;
   determining a portion of the first metadata corresponding to the required metadata category; and
   using the portion to generate the metadata sample.

18. The non-transitory, computer-readable medium of claim 17, wherein retrieving the required metadata category further comprises:
   receiving a user input of a required search category for the latent index; and
   determining the required metadata category based on the required search category.

19. The non-transitory, computer-readable medium of claim 15, wherein processing the first data profile using the first embedding algorithm comprises:
   generating a first feature input based on the first dataset;
   inputting the first feature input into the first embedding algorithm, wherein the first embedding algorithm is trained on previous versions of the latent index and search results of previous search requests on the previous versions of the latent index; and
   receiving a first output from the first embedding algorithm, wherein the first output comprises the latent index.

20. The non-transitory, computer-readable medium of claim 15, wherein generating for display the result based on processing the embedded request using the latent index further comprises:
   determining whether the first dataset comprises the first text string; and
   determining the result based on whether the first dataset comprises the first text string.

* * * * *